United States Patent
Craig et al.

(10) Patent No.: US 12,067,812 B1
(45) Date of Patent: *Aug. 20, 2024

(54) SYSTEM AND METHOD FOR ANALYZING VEHICLE DATA

(71) Applicant: Nationwide Mutual Insurance Company, Columbus, OH (US)

(72) Inventors: Robert B. Craig, Alexandria, OH (US); SeyedSobhan MoosaviNejadDaryakenari, Columbus, OH (US)

(73) Assignee: Nationwide Mutual Insurance Company, Columbus, OH (US)

( * ) Notice: Subject to any disclaimer, the term of this patent is extended or adjusted under 35 U.S.C. 154(b) by 1070 days.

This patent is subject to a terminal disclaimer.

(21) Appl. No.: 16/925,695

(22) Filed: Jul. 10, 2020

Related U.S. Application Data

(63) Continuation of application No. 15/461,089, filed on Mar. 16, 2017, now Pat. No. 10,740,990.

(51) Int. Cl.
*G07G 5/00* (2006.01)
*G06Q 40/00* (2023.01)
*G06Q 40/08* (2012.01)
*G07C 5/08* (2006.01)

(52) U.S. Cl.
CPC .......... *G07C 5/0808* (2013.01); *G06Q 40/08* (2013.01); *G07C 5/085* (2013.01)

(58) Field of Classification Search
CPC ....... G07C 5/0808; G07C 5/085; G06Q 40/08
USPC ....................................................... 701/33.4
See application file for complete search history.

(56) References Cited

U.S. PATENT DOCUMENTS

| | | | |
|---|---|---|---|
| 8,117,049 B2 | 2/2012 | Berkobin et al. | |
| 9,569,798 B2 | 2/2017 | Biemer et al. | |
| 9,569,799 B2 | 2/2017 | Biemer et al. | |
| 10,002,531 B2 * | 6/2018 | Lynch | G08G 1/0129 |
| 2008/0255888 A1 | 10/2008 | Berkobin et al. | |

(Continued)

OTHER PUBLICATIONS

Moreira-Matias, et al., "Predicting Taxi-Passenger Demand using Streaming Data", IEEE Transactions on Intelligent Transportation Systems Society, Jun. 2013, 10 pages.

(Continued)

*Primary Examiner* — Mahmoud S Ismail
(74) *Attorney, Agent, or Firm* — Morgan, Lewis & Bockius LLP

(57) ABSTRACT

A system and method for collecting and evaluating data associated with operation of a vehicle. Vehicle trajectory data associated with operation of a vehicle is received from a device configured to collect the vehicle trajectory data. The vehicle trajectory data comprises time-marked and location-marked speed data. The vehicle trajectory data is segmented into one or more segments, each representing a pattern of driver behavior. Event data is retrieved from one or more databases and corresponds to a time associated with the time marking of the vehicle trajectory data and a location associated with the location marking of the vehicle trajectory data. The segments are correlated with the event data using the time and the location. The correlations are analyzed. Based on the analysis, associations between the vehicle trajectory data and the event data are determined. The associations represent a causal relationship between the segments and the event data.

6 Claims, 15 Drawing Sheets

(56) References Cited

U.S. PATENT DOCUMENTS

| | | |
|---|---|---|
| 2016/0086285 A1 | 3/2016 | Jordan et al. |
| 2016/0171521 A1 | 6/2016 | Ramirez |
| 2016/0239925 A1 | 8/2016 | Biemer et al. |
| 2016/0239926 A1 | 8/2016 | Biemer et al. |
| 2016/0275623 A1 | 9/2016 | Biemer et al. |
| 2016/0275624 A1 | 9/2016 | Biemer et al. |
| 2016/0275625 A1 | 9/2016 | Biemer et al. |
| 2017/0103467 A1 | 4/2017 | Biemer et al. |
| 2017/0116678 A1 | 4/2017 | Biemer et al. |
| 2017/0109827 A1 | 8/2017 | Huang et al. |
| 2018/0060970 A1* | 3/2018 | Oduor .................. G06Q 40/08 |
| 2018/0122016 A1 | 5/2018 | Oduor et al. |

OTHER PUBLICATIONS

Zheng, et al., "Geolife GPS Trajectory Dataset", User Guide, Oct. 31, 2011, 4 pages.

Lou et al., "Map-Matching for Low-Sampling-Rate GPS Trajectories", in Proceedings of the 17th ACM SIGSPATIAL ntemational Conference on Advances in Geographic Information Systems, Nov. 4-6, 2009, 10 pages.

Goh et al., "Online Map-Matching based on Hidden Markov Model for Real-Time Traffic Sensing Applications", 15th ntemational IEEE Conference on Intelligent Transportation Systems, Sep. 2012, 6 pages.

Zheng et al., "Reducing Uncertainty of Low-Sampling-Rate Trajectories", IEEE 28th International Conference on Data Engineering, Apr. 2012, 12 pages.

Anagnostopoulos et al., "Global Distance-Based Segmentation of Trajectories", in Proceedings of the 12th ACM SIGKDD International Conference on Knowledge Discovery and Data Mining, Aug. 2006, 10 pages.

Buchin et al., "Segmenting Trajectories by Movement States", Advances in spatial data handling, 2013, 12 pages.

Chen et al., "Pathlet Learning for Compressing and Planning Trajectories", Proceedings of the 21st ACM SIGSPATIAL International Conference on Advances in Geographic Information Systems, Nov. 2013, 4 pages.

Montoliu et al., "Discovering Places of Interest in Everyday Life from Smartphone Data", Multimedia Tools and Applications, 62 (1 ), 26 pages.

Wang et al., "An Efficient Sampling Method for Characterizing Points of Interests on Maps", IEEE 3oth International : Conference on Data Engineering, Mar. 31-Apr. 4, 2014, 12 pages.

Yan et al., "SeMiTri: A Framework for Semantic Annotation of Heterogeneous Trajectories", Proceedings of the 14th International Conference on Extending Database Technology, Mar. 2011, 12 pages.

Chu et al., Visualizing Hidden Themes of Taxi Movement with Semantic Transformation, Visualization Symposium (PacificVis) IEEE Pacific, Apr. 2014, 8 pages.

Wu et al., "Semantic Annotation of Mobility Data Using Social Media", Proceedings of the 24th International Conference on World Wide Web, May 2015, 11 pages.

Su et al., "Making Sense of Trajectory Data: A Partition-and-Summarization Approach", IEEE 31st International Conference on Data Engineering, Apr. 2015, 12 pages.

Kuge et al., "A Driver Behavior Recognition Method Based on a Driver Model Framework", Society of Automotive Engineers Inc., 109(6), 1998, 8 pages.

Liu et al., Modeling and Prediction of Human Driver Behavior, Proceedings of the 9th International Conference on Human-Computer Interaction, Aug. 2001, 5 pages.

Sathyanarayana et al., "Driver Behavior Analysis and Route Recognition by Hidden Markov Models", Proceedings of the 2008 IEEE International Conference on Vehicular Electronics and Safety, Sep. 2008, 6 pages.

Elander et al., Behavioral Correlates of Individual Differences in Road-Traffic Crash Risk: An Examination of Methods and Findings, Psychological Bulletin, 113(2), 1993, pp. 279-294.

Hart et al., "The Theory of Contracts", Department of Economics, Massachusetts Institute of Technology, Mar. 1986, 137 pages.

Krumm et al., "Predestination: Inferring Destinations from Partial Trajectories", International Conference on Ubiquitous :omputing, Sep. 2006, 18 pages.

Han et al., "Optimal Segmentation of Signals and its Application to Image Denoising and Boundary Feature Extraction", Image Processing, Nov. 2004 vol. (4), 4 pages.

Rissanen, "Modeling by Shortest Data Description", Automatica, Sep. 1978, 14(5), 7 pages.

Koon et al., "Robust Time-Referenced Segmentation of Moving Object Trajectories", Eighth IEEE International Conference on Data Mining, Dec. 2008, 6 pages.

Buchin et al., "An Algorithmic Framework for Segmenting Trajectories based on Spatio-Temporal Criteria", Proceedings of the 18th SIGSPATIAL International Symposium on Advances in Geographic Information Systems, ACM-GIS, Nov. 2010, 10 pages.

Alewijnse et al., "A Framework for Trajectory Segmentation by Stable Criteria", Proceedings of the 22nd ACM SIGSPATIAL International Symposium, Nov. 2014, 10 pages.

Zheng et al., "Approximate Keyword Search in Semantic Trajectory Database", IEEE 31st International Conference on Data Engineering, Apr. 2015, 12 pages.

Mann et al., "Trajectory Segmentation Using Dynamic Programming", 16th International Conference on Pattern Recognition,Feb. 2002, vol. 1, 4 pages.

Alewijnse et al., "Model-Based Segmentation and Classification of Trajectories", Proceedings of the 3oth European Norkshop on Computational Geometry, Mar. 2014, 4 pages.

Panagiotakis et al., "Segmentation and Sampling of Moving Object Trajectories Based on Representativeness", IEEE Transactions of Knowledge and Data Engineering, Jul. 2012, 24(7), 16 pages.

Stenneth et al., "Transporation Mode Detection Using Mobile Phones and GIS Information", Proceedings of the 19th /ACM SIGSPATIAL International Conference on Advances in Geographic Information Systems, Nov. 2011, 10 pages.

Yan et al., "SeTraStream: Semantic-Aware Trajectory Construction over Streaming Movement Data", Advances in Spatial and Temporal Databases, 12th International Symposium, Aug. 2011, 18 pages.

Cheng et al., "Tum-Intent Analysis Using Body Pose for Intelligent Driver Assistance", IEEE Pervasive Computing, Oct.-Dec. 2006, 5(4 ), 11 pages.

Salvucci, Inferring Driver Intent: A Case Study In Lane-Change Detection, Proceedings of the Human Factors and Ergonomics Society Annual Meeting, Sep. 2004, 48(19), 4 pages.

Spiegel, "Discovery of Driving Behavior Problems", Smart Information Systems: Computational Intelligence for Real-Life Applications, Jan. 2015, 29 pages.

* cited by examiner

Algorithm 1: Wedding Cake [20] Regularization

Input: $\phi$, $\Phi$, $S_{th}$, $A_{th}$, $H_{th}$

1. for $sp = (\phi.s - S_{th})$ to $(\phi.s + S_{th})$ do
2.     for $ac = (\phi.a - A_{th})$ to $(\phi.a + A_{th})$ do
3.         for $hd = (\phi.h - H_{th})$ to $(\phi.h + H_{th})$ do
4.             ▷ Extending state $\phi$
5.             for $\phi' \in \Phi$ do
6.                 $\phi'' \leftarrow ((\phi.s+sp), (\phi.a+ac), (\phi.h+hd))$
7.                 $prob_{\phi'' \to \phi'} += \frac{prob_{\phi \to \phi'}}{Euclidean(\phi, \phi'')}$
8.             end
9.             ▷ Extending states in $\Phi$
10.             for $\phi' \in \Phi$ do
11.                 $\phi'' \leftarrow ((\phi'.s+sp), (\phi'.a+ac), (\phi'.h+hd))$
12.                 $prob_{\phi \to \phi''} += \frac{prob_{\phi \to \phi'}}{Euclidean(\phi', \phi'')}$
13.             end
14.         end
15.     end
16. end

Output: Regularized Markov Model

FIGURE 4

Algorithm 2: Trajectory Transformation

Input: $\gamma$, $M$

1. $S_\gamma \leftarrow ()$
2. for $i = 1$ to $n-1$ do
3.     $\phi \leftarrow ReturnState(M, \rho_i)$
4.     $\phi' \leftarrow ReturnState(M, \rho_{i+1})$
5.     $v = 0$
6.     if $\phi \neq \phi'$ or $\phi.a \neq 0$ then
7.         $prob_{\phi \to \phi'} = ReturnProb(M, \phi, \phi')$
8.         $R \leftarrow TransitionFrom(M, \phi)$
9.         ▷ $R = \{r \mid (\phi \to r) \in \Delta\}$
10.         for $r \in R$ do
11.             $prob_{\phi \to r} = ReturnProb(M, \phi, r)$
12.             $v += Euclidean(\phi', r) \times prob_{\phi \to r}$
13.         end
14.         $v = \frac{v}{|R|}$
15.     end
16.     $S_\gamma \leftarrow Append(S_\gamma, v)$   ▷ Append $v$ at the end of $S_\gamma$
17. end

Output: $S_\gamma$   ▷ $S_\gamma$ is transformed version (signal) of $\gamma$

```
Algorithm 3: Check Relevancy
    Input: p, ε, th_p, th_tp
 1  for e ∈ ε do
 2      if e.type == "physical fact" then
 3          dist ← Haversine(p.lat, p.lng, e.lat, e.lng)
 4          if dist ≤ th_p then
 5              return 1
 6          end
 7          else return 0
 8      end
 9      else if e.type == "temporal-physical event" then
10          dist ← Haversine(p.lat, p.lng, e.lat, e.lng)
11          if dist ≤ th_tp and TimeMatch(p.t, e.t) then
12              return 1
13          end
14          else return 0
15      end
16      else if e.type == "temporal event" then
17          if TimeMatch(p.t, e.t) then
18              return 1
19          end
20          else return 0
21      end
22  end
    Output: 0/1
```

FIGURE 8A

TABLE I.  SOME STATISTICAL FACTS ABOUT NATIONWIDE TRAJECTORIES DATASET.

| Time | Number of Trajectories | Number of Drivers | Total Distance (KM) | Total Duration (Hours) |
|---|---|---|---|---|
| July 2011 – Dec 2011 | 31,922 | 100 | 553,768 | 10,174 |
| Jan 2012 – Dec 2012 | 50,896 | 78 | 844,597 | 16,030 |
| Jan 2013 – Dec 2013 | 26,180 | 50 | 269,858 | 8,029 |
| Jan 2014 | 38 | 5 | 468 | 10 |
| Total | 109,036 | 103 | 1,668,691 | 34,243 |

TABLE II.  SUMMARY OF TEST SET AND SEGMENTATION RESULT.

| Route | Number of Trajectories | Avg. Trajectory Length (secs) | Avg. Number of Segments | Std. of Number of Segments |
|---|---|---|---|---|
| I-70 | 1,572 | 324 | 5.4 | 4.9 |
| I-71 | 1,320 | 549 | 7.5 | 6.8 |
| I-270 | 701 | 389 | 4.9 | 3.8 |
| I-670 | 443 | 392 | 7.4 | 6.4 |
| 315 Fwy | 426 | 705 | 8 | 7 |

FIGURE 8B

TABLE III – SUMMARY OF CONGESTION REPORT DATASET, COLLECTED BY BING AND MAPQUEST APIs

| Route | #Bing congestion | #MapQuest congestion |
|---|---|---|
| I-70 | 333 | 69 |
| I-71 | 337 | 748 |
| I-270 | 214 | 259 |
| I-670 | 239 | 345 |
| 315 Fwy | 93 | 219 |

TABLE IV: ANNUAL AVERAGE DAILY TRAFFIC (AADT) VOLUME ESTIMATION FOR 2010 FOR FRANKLIN COUNTY OF COLUMBUS, OH

| Route | I-70 | I-71 | I-270 | I-670 | 315 Fwy |
|---|---|---|---|---|---|
| Truck Load% | 11.5% | 9.7% | 13.5% | 5.3% | 4.3% |
| Route Length (miles) | 7.5 | 10.4 | 9.9 | 8.1 | 10.9 |
| #Vehicles (millions) | 1.3 | 1.9 | 1.4 | 1.4 | 1.3 |

FIGURE 12B

TABLE V. ANNUAL AVERAGE DAILY TRAFFIC (AADT) VOLUME ESTIMATION FOR 2014 FOR FRANKLIN COUNTY OF COLUMBUS, OH.

| Route | I-70 | I-71 | I-270 | I-670 | 315 Fwy |
|---|---|---|---|---|---|
| Truck Load% | 9.4% | 8.9% | 11.4% | 4.9% | 3.7% |
| Route Length (miles) | 7.5 | 11.8 | 11.1 | 7.3 | 11.4 |
| #Vehicles (millions) | 0.8 | 1.4 | 0.5 | 1.0 | 1.1 |

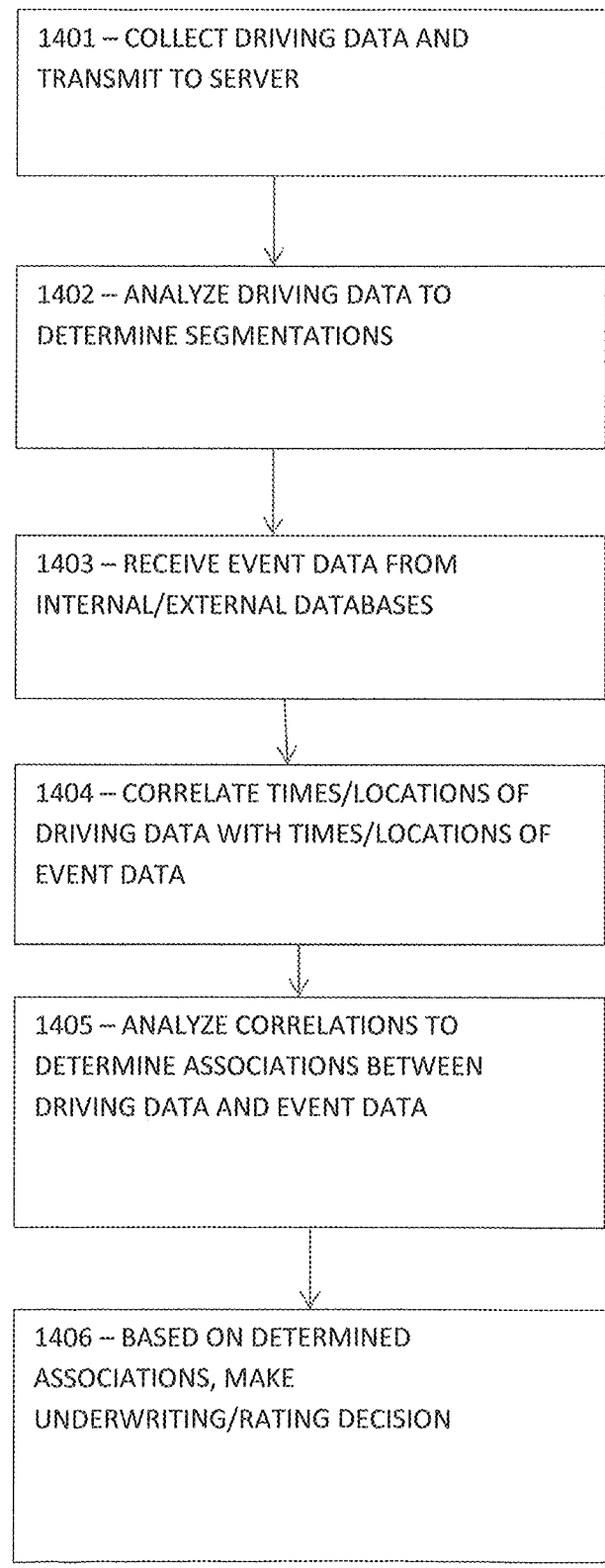

SYSTEM AND METHOD FOR ANALYZING VEHICLE DATA

CROSS REFERENCE TO RELATED APPLICATIONS

This application is a continuation of U.S. patent application Ser. No. 15/461,089 filed Mar. 16, 2017 entitled "System and Method for Analyzing Vehicle Data," which is incorporated by reference herein in its entirety.

FIELD OF THE INVENTION

The invention relates to methods and systems for analyzing data originating from motor vehicle systems.

BRIEF SUMMARY OF THE INVENTION

Embodiments of the invention involve a system and method for collecting and evaluating data associated with operation of a vehicle. Vehicle trajectory data associated with operation of a vehicle is received from a device configured to collect the vehicle trajectory data. The vehicle trajectory data comprises time-marked and location-marked speed data. The vehicle trajectory data is segmented into one or more segments. Each of the one or more segments represents a pattern of driver behavior. Event data is retrieved from one or more databases. The event data corresponds to a time associated with the time marking of the vehicle trajectory data and a location associated with the location marking of the vehicle trajectory data. The segments are correlated with the event data using the time and the location. The correlations are analyzed. Based on the analysis, associations between the vehicle trajectory data and the event data are determined. The associations represent a causal relationship between the segments and the event data.

In some embodiments, the invention further includes determining underwriting data for the vehicle or a driver of the vehicle based on the associations.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIG. 4 illustrates an exemplary algorithm used in connection with an embodiment of the present invention;

FIG. 5 illustrates an exemplary algorithm used in connection with an embodiment of the present invention;

FIG. 7 illustrates an exemplary algorithm used in connection with an embodiment of the present invention;

FIGS. 8A, 8B and 8C provide tables illustrating data used in connection with an embodiment of the present invention;

FIGS. 12A and 12B provide tables illustrating data used in connection with an embodiment of the present invention;

FIG. 14 is a flow chart illustrating an exemplary method of the present invention.

DETAILED DESCRIPTION OF THE EXEMPLARY EMBODIMENTS

Spatio-temporal data is increasingly available due to the ubiquity of sensors of various types and the almost unlimited capacity of data storage resources. Consequently, numerous data-analytic applications have been developed to gain a variety of useful insights from such data. However, it is difficult to discover driving context based on data collected on the behavior of drivers. Embodiments of the present invention analyze the behavior of drivers in terms of driving patterns extracted based on externally observable phenomena (e.g., vehicle's speed) only, and without supervised learning.

Described herein is a system and method for discovering driving context by extracting behavior-based driving patterns (e.g., changing lanes) and analyzing patterns by finding their underlying causes (e.g., traffic congestion). Embodiments of the present invention include two major components: a method for behavior-based segmentation of a trajectory, where each segment corresponds to a driving pattern and a method that determines the set of potential causes. Driving context is evaluated on a dataset of personal car trajectories. The framework allows for discovery of context and deriving correlations between driving patterns and various extrinsic causes.

Embodiments of the present invention thus involve discovering driving context by exploring characteristics for a given context based on behavior of drivers. A context may be identified as a type of road (e.g., highway), a specific route (e.g., Interstate 270), a city, or an area of interest. Behavior of a driver may be defined in terms of driving patterns. Embodiments of the present invention determine those driving patterns which represent behavior of drivers within a specific context. In addition, embodiments of the present invention may be used to determine the reason why a specific pattern is happening within a context.

Figure 1:
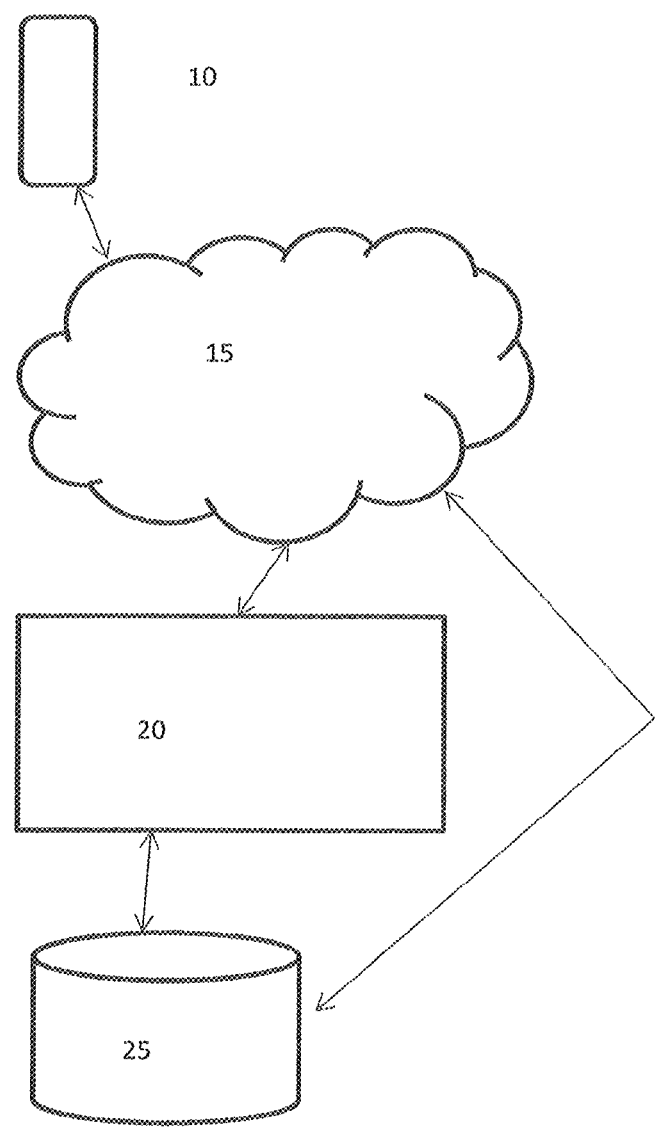
FIG. 1 illustrates an exemplary block diagram of a system of the present invention.

With reference to FIG. 1, a device 10 is used to collect data associated with the operation of a motor vehicle. The device may be any device that is capable of receiving and transmitting data in accordance with the methodology described herein and collecting speed and associated time stamps. For example, the device may be a device that connects to and receives data from (wirelessly or wired) the on-board diagnostics system of a vehicle, or may be a mobile phone that either collects data from the on-board diagnostics system of a vehicle or has the capability to sense/collect vehicle data itself. By way of specific example, the device may be an OBD-II plug-in device that pulls, at a minimum, position timestamp, speed and geographical location, and may collect other types of vehicle data. The device may also be a smart phone application that pulls either GPS latitude and longitude or GPS speed and the position timestamp. The device may also be a connected car that provides, at a minimum, speed and position timestamp. All collection methods are within the scope of the present invention, so long as speed, time stamps and location stamps are collected. The device transmits the data that it collects, e.g., wirelessly, over a computer network 15 or using cellular telephone communications, to a server 20. Server 20 may employ one or more databases 25 to store data associated with the operation of the system.

Figure 2:
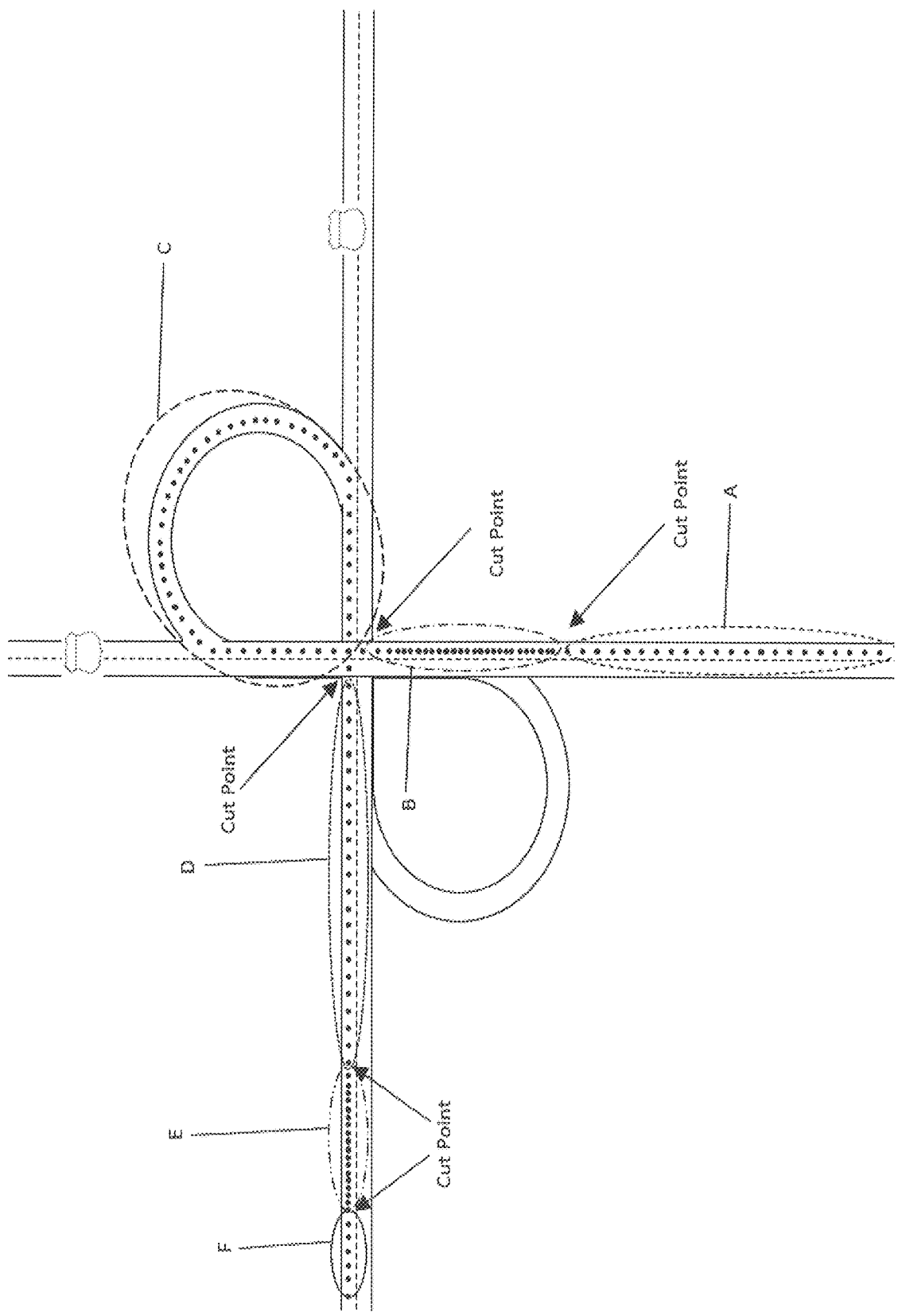
FIG. 2 illustrates an exemplary vehicle trip and associated trajectory.

With reference to FIG. 2, an exemplary use case of an embodiment of the present invention is described. This figure illustrates a sample trajectory with several patterns of driving behavior specified by ovals A through F. Also, arrows show the points of transition between patterns (referred to as a cut point), where new patterns are introduced. Each pattern illustrates a homogeneous part of a trajectory and existence of each pattern is correlated to some causes (e.g., traffic congestion). The trip represented in FIG. 2 occurred on Dec. 7, 2012 on Interstate 270 in Columbus, Ohio. Dots show the location of the car for every second of the trip. The trajectory begins at the bottom center (oval A) and continues to the left (oval F) after a clock-wise turn. Different parts of the trip can be seen to exhibit different patterns of driving behavior, as marked out by the ovals A through F. For instance, the oval B shows slow movement, where the captured locations are close to each other. Then, a transition in the pattern occurs while entering the ramp and merging into a highway (oval C). Finally, after the driver has merged into the highway, there is an increase in speed, which is another pattern of driving behavior (oval D). The example illustrates how patterns of driving behavior may be determined. Additionally, this example shows that driving patterns are portions of a driver's trajectory where there is homogeneity of driving behavior. More particularly, a driving pattern is the consistent behavior of a driver within a sub-trajectory. The cause behind a transition between patterns, hence, introducing a new pattern, can be extrinsic (e.g., an accident, a traffic signal, a traffic congestion, etc.) or intrinsic (e.g., driver-generated distraction, personality of the driver, etc.).

With further reference to FIG. 2, exemplary potential causes resulting in specific patterns are illustrated. Following with the example, a transition in driving pattern occurs in the middle of highway. The new pattern, shown with oval E, is a slow move. The cause behind this change is a car accident that has blocked two lanes of the highway and caused a traffic jam. The problem of discovering driving context can be examined by extracting driving patterns and exploring causes that made each pattern happen. This problem presents several complexities, as follows. First, unlike approaches that collect data using a fully monitored environment (e.g., with cameras placed inside the car, monitoring the driver's every move and expression) and a small set of drivers and routes, the present invention works on a dataset that is the result of collecting data by observing only externally visible phenomena (e.g., the vehicle's speed) with no additional intrusive monitoring. In addition, because of the size of the dataset of trajectories, and the potentially wide range of identifiable and useful driving patterns, a supervised approach is not viable. Finally, because intrinsic reasons could also be causes of specific pattern transitions, and even if drivers were comprehensively monitored, relating a pattern to extrinsic causes still remains challenging. Thus, finding the valid set of patterns and also the exact set of extrinsic causes that underlie each pattern, which is the basis of driving context, is a challenging problem that is solved using embodiments of the present invention. Embodiments of the present invention provide information responsive to questions such as how similar are the driving contexts of different routes in a city or across different cities within a state; how driving patterns in a specific context are correlated with traffic conditions; and how safe or risky is the behavior of a given driver with respect to a specific context.

A potential use of the information resulting from application of the methods and systems of embodiments of the present invention is Usage-Based Insurance (UBI). Here, an automobile insurance company provides a personalized insurance policy for a customer, based on his/her driving history. For UBI, the car insurance company needs to analyze a driver's behavior and compare it to a reference population of drivers in order to find out how "risky" or "safe" the behavior of the driver is. Assume Customer A is a new customer and her driving history reveals that her driving patterns, within a context c, are on average 25% correlated with traffic conditions. However, for a reference population of drivers in context c, driving patterns are on average 55% correlated with traffic conditions. Hence, Customer A appears not to deal with traffic conditions well, and her driving may be characterized as risky.

The systems and methods of the present invention provide a framework to discover driving context efficiently. This framework includes two major components, segmentation and context analysis. Given an input trajectory T, segmentation applies a behavior-based trajectory segmentation algorithm to partition T into non-overlapping consecutive segments, where each segment corresponds to a pattern of driving behavior. Then, context analysis, the second component of system, reveals the extrinsic causes that caused each driving pattern to happen. Context analysis works based on some analysis across a set of external spatiotemporal data sources. The primary dataset in this study is a dataset of about 110,000 trajectories that is used to train and evaluate the components of the framework. The segmentation approach finds driving patterns based on behavior of drivers. This component leverages a novel transformation of trajectories along with a dynamic programming approach for segmentation. The context analysis component combines a variety of spatio-temporal data sources to analyze driving patterns for discovery of context and gain new insights.

Assume a transportation database D of the form $(Y, \Gamma)$ where Y and $\Gamma$ are the set of vehicles and trajectories, respectively. Each trajectory $\gamma \in \Gamma$ is sequence of $|\gamma|$ data points $(\rho 1, \rho 2, \ldots, \rho|\gamma|)$. Each data point $\rho$ is a tuple of the form $\{t, lat, lng, s, a, h\}$ which captures a vehicle's status at time t as its latitude and longitude are (lat, lng), with speed s (km/h), acceleration a (m/s$^2$), and heading h (degrees). All time is assumed to be in seconds. Also, the heading is the direction of the moving vehicle, described by a degree-value between 0 and 359, where 0 means the north.

The discovery of driving context can be divided into two sub-problems: segmentation and causality analysis. A segmentation for a trajectory $\gamma$ into n segments, denoted as seg$\gamma$, is a set of cutting indexes seg$\gamma = (I_1, I_2 \ldots, I_n)$ that mark the beginning points of the segments within a trajectory. Thus, a set of cutting data points for the segmented trajectory $\gamma$ can be defined as $(p_{I1}, p_{I2} \ldots p_{In})$. Note that $p_{I1} = \rho_1$. All data points between indexes $I_i$ and $I_{i+1}$, including point $\rho_{Ii}$ and excluding point $\rho_{Ii+1}$, belong to the $i^{th}$ segment. The $i^{th}$ segment of seg$_\gamma$ is denoted as seg$^i_\gamma$ its size as $|\text{seg}^i_\gamma|$. Note that segments are non-overlapping. Each segment represents a driving pattern and each cutting point $p_{Ii}$, $I_i \in \text{seg}_\gamma$, represents a transition between patterns. FIG. 2 shows several segments (shown as ovals) and cutting points (marked using arrows). Considering the segmentation task as an optimization problem, the optimization goals are defined as i) maximizing homogeneity within segments and ii) minimizing the possible number of segments.

The existence of a segment is potentially relevant to extrinsic or intrinsic causes. As described herein, the focus is on extrinsic causes that we refer to as events. Data describing events are tracked in an event database E of the form e=(t, lat, lng, r, type, desc) where each event e∈E occurs in time t, in a geographical area whose center is (lat, lng) with radius r of type type and its description is desc. Example instances of E are as follows:

$e_1$=(NULL, 39.99, −83.00, 12, PHYSICAL_FACT, TRAFFIC_LIGHT) is a physical fact which represents the location of a traffic light near the university campus in Columbus Ohio.

Note that an event with t=NULL represents a time-invariant event which is referred to as a fact.

$e_2$=(7/2/2015, 40.70, −74.25, 60, TEMPORAL_EVENT, TEMP=67) is a temporal event which represents the weather of New York downtown in Apr. 2, 2015, i.e., 67 Fahrenheit degrees.

$c_3$=(4/11/2014, 33.4, −82.37, 30, TEMPORAL_EVENT, TREND_SOCIAL MEDIA MESSAGE=GOLF TOURNAMENT) is another temporal event which represents a trending topic in social media on Apr. 11, 2014 in Augusta, Georgia, about a golf tournament.

Thus, given the set of cutting points $(p_{f1}, p_{f2} \ldots p_{fn})$, identified as result of segmenting trajectory γ, and the database E of events, the second sub-problem (i.e., causality analysis) is one of finding if, and to what extent, each cutting point $p_{fi}$, 1≤i≤n, is related to an event e∈E.

The second component, context analysis, analyzes the extracted patterns by exploring underlying causes that cause each pattern to happen.

Figure 3:
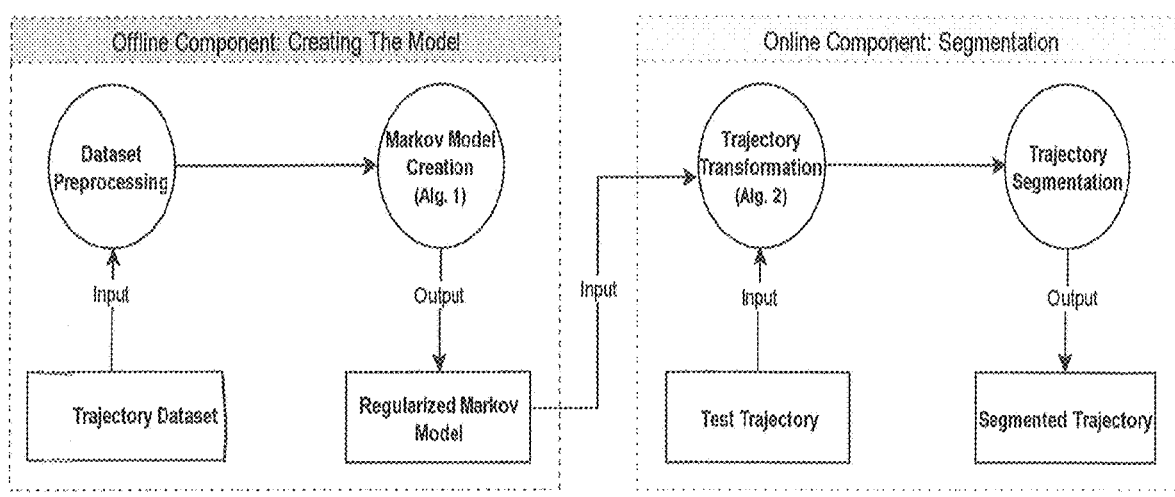
FIG. 3 illustrates an exemplary methodology illustrating one aspect of the present invention.

Segmentation involves partitioning a trajectory based on the behavior of the driver, such that each resulting segment corresponds to a specific driving pattern. FIG. 3 depicts the overall process of segmentation, which includes offline and online components. The offline component includes the main steps to create a regularized Markov model to model behavior of drivers. In addition, the online component consists of a novel transformation of trajectories along with a dynamic programing trajectory segmentation approach. More particularly, the offline component of this process models the behavior of drivers in terms of creating a Markov model to be used in an online component. The online component of the segmentation process provides the segmentation of trajectories. The main steps for segmentation approach are Dataset Preprocessing (i.e., pre-processing using historical trajectories), Markov Model Creation (offline), Trajectory Transformation (online), and Trajectory Segmentation (i.e., processing in real-time as a new trajectory is identified). These steps are described in more detail as follows.

Dataset Preprocessing: Regarding the description of the data model described herein, the dataset is a collection of trajectories, where each trajectory has a sequence of data points. The exemplary steps for pre-processing the dataset are as follows:

Cleaning: Remove data points with missing or noisy (out of range) GPS records.

Rounding: Round the values of acceleration and heading to be divisible by 0:25 and 5 respectively. This step helps to simplify the Markov model by reducing the possible number of states. Note that the coefficient 0:25 is set to avoid having numerous real-valued numbers as acceleration. Also, since the change of heading by less than 5° is not a significant change in direction, the normalization coefficient for heading is considered as 5.

Create training and test sets: The training set is used for creating the Markov model and the test set for experiments.

Markov Model Creation: A memory-less Markov model M={Φ, Δ, Π} is created, where Φ is the set of states, Δ is the set of transition between states (along with the frequency of each transition), and Π is the set of probabilities of transition between the states. The following guidelines are used to create M:

State: Define a state φ∈Φ as φ=(Speed, Acceleration, Heading).

Transition: Given a trajectory $\gamma=(\rho_1, \rho_2, \ldots, \rho_n)$, for each pair of consecutive data points $\rho_i$, and $\rho_{i+1}$, of γ, where 1≤i≤n, create two states are created $\varphi_i=(s_i, a_i, h_i)$ and $\varphi_{i+1}=(s_{i+1}, a_{i+1}, h_{i+1})$ for $\rho_i$, and $\rho_{i+1}$, respectively. A transition is denoted from state ($\varphi_i$, $\varphi_{i+1}$, as $\varphi_i \rightarrow \varphi_{i+1}$. If Δ does not contain transition $\varphi_i \rightarrow \varphi_{i+1}$, then insert ($\varphi_i \rightarrow \varphi_{i+1}$, 1) into Δ. Otherwise, the frequency of transition is increased $\varphi_i \rightarrow \varphi_{i+1}$ by 1.

Probability of Transition: For a state φ, assume there is a $\delta=\{(\varphi_i \rightarrow \varphi_i, n_1, \ldots, (\varphi \rightarrow \varphi_k, n_k)\}$, and where $n_i$ is the number of observed transitions φ to $\varphi_i$ in the training dataset, we update Π by inserting the probability of each transition $\varphi_i \rightarrow \varphi_i$, 1≤i≤k, using Equation 1:

$$prob_{\phi \rightarrow \phi_i} = \frac{n_i}{\sum_{j=1}^{k} n_j} \qquad (1)$$

By following the above guidelines, it is possible that a sparse Markov model results. For example, no transition may be observed from $\varphi_1=(25, -2, 170)$ to $\varphi_2=(24, -2, 170)$, although such a transition is quite likely to happen. In order to deal with this shortcoming of a basic Markov model, a further processing step is needed known as Regularization. To do this, an existing, and intuitive, regularization approach known as The Wedding Cake Technique may be adapted. Based on this technique, we assume we have a state φ=(s, a, h) which has transition to a set of states $\Phi=\{(s_1,a_1,h_1), (s_2,a_2,h_2), \ldots, (s_n,a_n,h_n)\}$. $S_{th}$, $A_{th}$, and $H_{th}$ are used as thresholds on speed, acceleration, and heading respectively, to define regularization intervals. Algorithm 1 is used to regularize the Markov model.

Algorithm 1, shown in FIG. 4, is used to regularize the Markov model. In Algorithm 1, a Euclidean function calculates the Euclidean distance between two states. Prior to using this distance measure, the value of all features is normalized to lie between 0 and 1. The idea of regularization is intuitive, where the states of the basic Markov model are extended and then the probability values of the transitions are updated for the updated states appropriately. The thresholds of the different features are set heuristically during the experiments.

The resulting regularized Markov model is a weighted graph which models behavior of drivers in terms of likelihood of changes in behavior patterns. For example, by having such a graph, it may be inferred that the speed change from 20 km/h to 50 km/h is not likely to happen. On the contrary, the change in speed by less than 5 km/h is quite likely.

Trajectory Transformation: Recall that the aim of the segmentation approach is to provide a segmentation of trajectories based on behavior of drivers. Here, the goal is to transform an input trajectory into a signal in Probabilistic Movement Dissimilarity (PMD) space. Suppose we have a trajectory $\gamma=(\rho_1, \rho_2, \ldots, \rho_n)$ and a regularized Markov model M={Φ, Δ, Π}, Algorithm 2 shown in FIG. 5 is used to map $\gamma$ to a signal S$\gamma$ in PMD space. Given consecutive data points $\rho_i$, $\rho_{i+1} \in \gamma$, Algorithm 2 first maps them to states $\varphi$ and $\varphi'$ respectively. Then, the algorithm calculates how unlikely the transition $\varphi \to \varphi'$ is, given the model M.

Figure 6A:
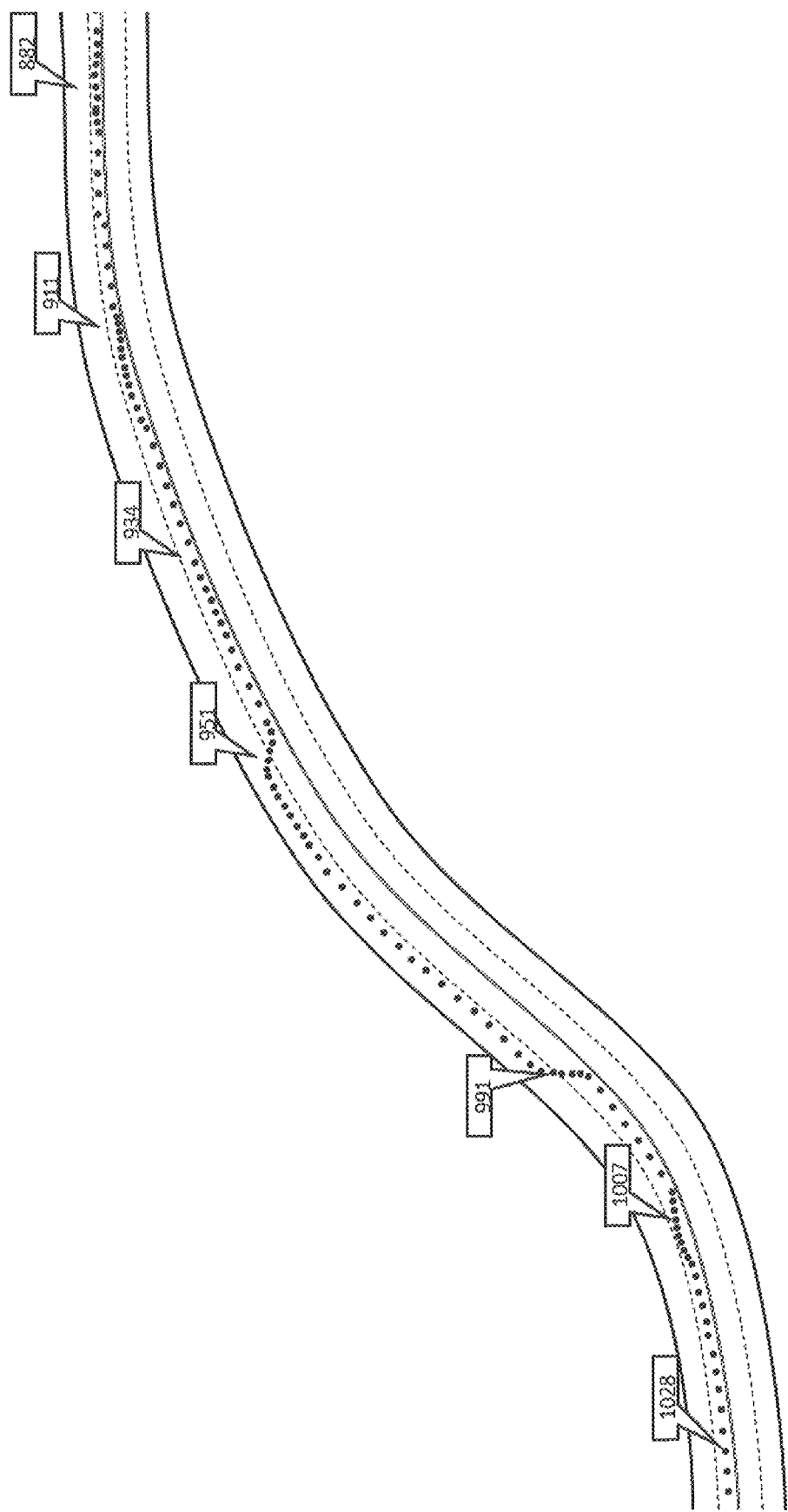
FIGS. 6A and 6B illustrate an exemplary vehicle trip and associated signal trajectory of an embodiment of the present invention.
Figure 6B:
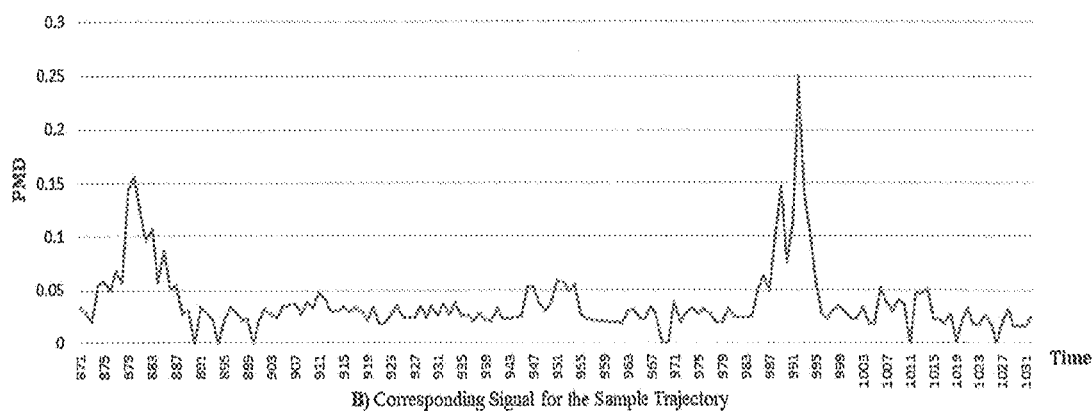

FIGS. 6A and 6B depict, respectively, a sample trajectory (FIG. 6A) and its corresponding signal in PMD space (FIG. 6B). Dots on the map show trip points where the trajectory goes from right to left. Algorithm 2, shown in FIG. 5, produces the signal from the input trajectory.

In Algorithm 2, ReturnState returns a state corresponding to input data point $\rho_i$, and ReturnProb returns transition probability from $\varphi$ to $\varphi_1$. TransitionFrom returns a set of states R given an input state $\varphi$, such that transition $(\varphi \to r) \in \Delta$ for $r \in R$. Also, note that if $\varphi$ and $\varphi_1$ represent the same state with zero acceleration, then the transition is quite likely. In other words, the unlikelihood of this specific kind of self-transition is zero.

Based on this algorithm, a test trajectory is mapped into a signal in PMD space. The signal of a trajectory demonstrates the unlikelihood of behavior for each second of the trajectory. An unlikelihood score is calculated based on the transition probabilities in the Markov model M, created from the behavior of drivers in training set. Lines 7 to 14 in Algorithm 2 (FIG. 5) measure how far the observed transition $\varphi \to \varphi 1$ is from the expectation regarding the Markov model M. FIG. 6A depicts a sample trajectory and its corresponding signal in PMD space (6B). The numbers in rectangular call-outs in FIG. 6A show time stamps 882, 911, 934, 951, 991, 1007, and 1028 which can be matched with Time axis in FIG. 6B. The more unlikely the behavior of driver is, the larger the value of PMD. For instance, a large PMD value is observable for time stamp 991 in FIG. 6B, where the actual trajectory in FIG. 6A shows an unexpected reduction in speed and also a lane change. A signal in PMD space is used as a representation of the behavior of a driver for a given trajectory, in comparison with the rest of the population of drivers and trajectories Trajectory Segmentation: Once the signal for a trajectory has been created, the trajectory segmentation problem reduces to a Signal Segmentation problem. The approach for segmenting a signal is a dynamic programming algorithm that uses the Maximum Likelihood principle for segmenting one dimensional signals. Given an input signal S=($x_1$, $x_2$, ..., $x_N$), the Maximum Likelihood for S can be defined by Equation 2.

$$ML(\theta; x_1, x_2, \ldots, x_N) = f(x_1, x_2, \ldots, x_N|\theta) = \prod_{i=1}^{N} f(x_i|\theta) \quad (2)$$

In this formula, $\theta$ is the set of parameters for a probability density function (PDF) $f$, which can be estimated based on data points of signal S. The Gaussian distribution is leveraged to find the parameters of the PDF $f$. Thus, $\theta=(\mu, \sigma)$, where $\mu$ and sigma are the sample mean and standard deviation, respectively.

Recall that the goal of segmenting a trajectory $\gamma$, that is, its signal $S_\gamma=(x_1, x_2, \ldots, x_N)$, is to find a set of cutting indexes $\text{seg}_\gamma=(I_1, I_2, \ldots, I_n)$ that maximize the likelihood within segments and minimize n≤N, the best number of existing segments. The recurrence relation for segmenting the signal $S_\gamma$ is defined below:

$$SSC(S_\gamma, i, v) = \underset{i+2 \le j \le N}{\mathrm{argmax}}(ML(\theta; x_i, \ldots, x_j) + SSC(S_\gamma, j+1, v-1)) \quad (3)$$

In Equation 3, SSC($S_\gamma$, $i$, $v$) gives the best Segmentation Score for a sub-sequence of signal $S_\gamma$ which starts at index i, with the goal being to find v segments. Also, M L($\theta$; $x_i$, ..., $x_j$) gives the maximum likelihood score for sub-sequence ($x_i$, $x_{i+1}$, ..., $x_j$) of $S_\gamma$. Note that we assume the minimum length of a segment to be 2. The initial call for Equation 3 is SSC($S_\gamma$, 1, n).

Now, the question is how to determine the best number of existing segments within a signal? The Minimum Description Length (MDL) may be used for this purpose. MDL minimizes the Equation 4 for n=1, 2, ..., K, where n is the number of segments and K is the upper bound on the number of segments (chosen by the user):

$$MDL(n) = -\ln \prod_{i=1}^{n} f(x_{I_i}, x_{I_i+1}, \ldots, x_{I_{i+1}-1}, |\theta_i) + \frac{r_n}{2}\ln N \quad (4)$$

In Equation 4, $\theta_i$, is the parameter set of the corresponding PDF, rn is the number of estimated parameters (where n is the number of segments), and N is the length of the signal.

Figure 6C:
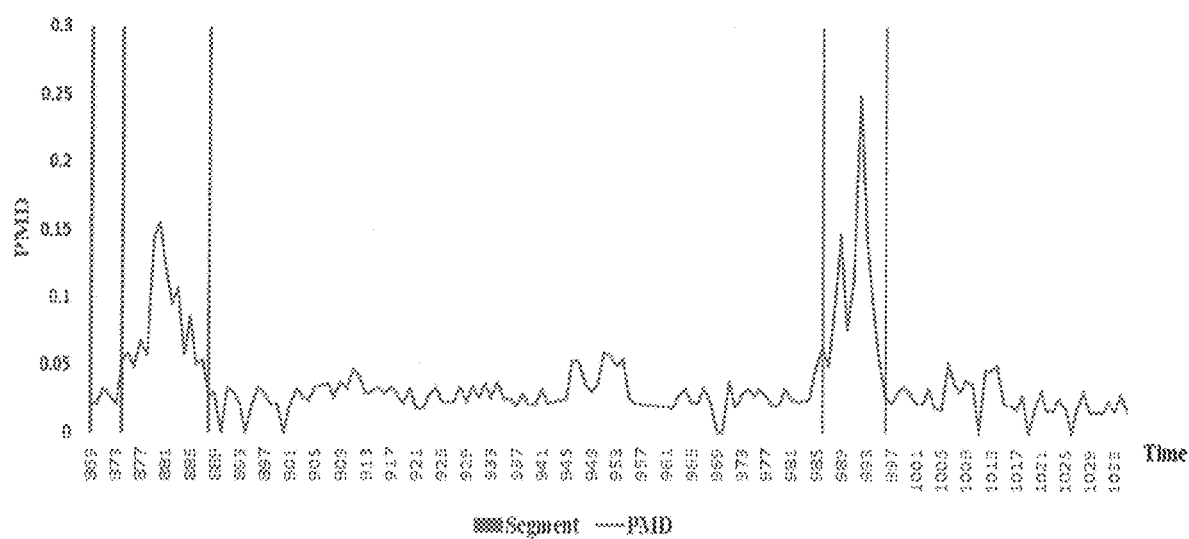
FIG. 6C is another illustration of the signal trajectory of an embodiment of the present invention.

FIG. 6C shows a part of a segmented signal which is related to the sample trajectory in FIG. 6A. The vertical lines in FIG. 6C show the starting points of segments (i.e., the cutting points). The best number of segments which has been found by MDL is 5.

More specifically, FIG. 6C illustrates the homogeneity of behavior of the driver within segments (patterns) and dissimilarity of patterns of behavior between neighboring segments, which is compatible with our optimization goals. The segment which starts at time stamp 986 in FIG. 6C is an example of behavior-based driving pattern which is captured by the segmentation process. Matching it with the actual trip in FIG. 6A, it can be seen that this segment is related to a driving pattern where the driver reduces speed and changes lanes. It is likely that these actions are due to traffic congestion. A method for discovering the underlying causes behind driving patterns is described herein.

Guarantee for Optimal Solution: The framework of the present invention leads to an optimal solution for the segmentation problem. The first optimization goal is defined as maximizing the homogeneity within segments, as described elsewhere herein. Based on Equation 3, the goal is to partition a signal S, to maximize the segmentation score SSC. In order to achieve the maximization, the Maximum Likelihood principle is leveraged to find the best cutting indexes to define segments. In this way, the segmentation method provides a guarantee to maximize the homogeneity within segments. Moreover, the MDL formulation (Equation 4) provides the guarantee to fulfill the second optimization goal which is minimizing the possible number of segments. In MDL, the parameter $r_n$ is used to minimize the final value, where it captures the number of estimated parameters. The less the number of segments, the less the number of estimated parameters will be. Thus, by MDL the number of segments is kept as low as possible.

In summary, aspects of the invention present a novel approach to extract behavior-based driving patterns by modeling behavior of a population of drivers in terms of creating a Markov model. Then, the Markov model is used for a novel transformation of trajectories. Finally, based on a given set of optimization goals, a dynamic programing solution is used for segmentation of transformed trajectories.

Context analysis is now described in more detail. The goal of context analysis is to analyze extracted driving patterns (segments) to explore the underlying causes that make each pattern happen. This step helps to identify the characteristics for a given context. As discussed previously, the existence of a driving pattern is potentially related to extrinsic or intrinsic causes. Here, the extrinsic causes, so-called events, are identified. Context analysis explores the set of potential causes.

Recall that for a given trajectory Y, the segmentation approach transforms $\gamma$ to a signal $S\gamma$ using Algorithm 2. Then, a dynamic programming-based segmentation algorithm is performed on $S_\gamma$ to obtain a set of cutting indexes $seg\gamma=(I_1, I_2 \ldots, I_n)$, implying cutting points $(p_{I1}, p_{I2} \ldots, p_{In})$. Having a database of events E and a cutting point $p_{Ii}$, $1 \leq i \leq n$, the goal is to find if $p_I$ is related to an event $e \in E$ or not. If it is found that $p_{Ii}$ is related to e, then this means the segment which starts at cutting index $I_i$ is potentially caused by event e. Note that a segment (pattern) can be caused by more than one event in some cases.

The relevancy relationship between a cutting point p and an event e is defined based on the type of the event. Three types of events are considered herein: physical fact, temporal-physical event, and temporal event. The following describes how relevancy is measured for each type of the event:

Physical Fact: An example is the presence of a traffic signal. In such a case, the relevancy can be measured as the distance between the locations of the cutting point p and the event e. It can then be said that p and e are related if their locations are within a specified distance threshold.

Temporal-Physical Event: An example of a temporal-physical event is the existence of traffic congestion in a specific place during a time interval. In this case, p and e can be said to be related if two following conditions are satisfied: (1) the time of the trajectory $\gamma$, where $p \in \gamma$, overlaps with the time interval of the event e, and (2) the distance between locations of p and e are lower than a threshold.

Temporal Event: An example is having a severe storm within a specific time interval. In this case, we say p is related to e if the time of trajectory $\gamma$, where $p \in \gamma$, overlaps with the time interval of event e. The implicit assumption for this case is that we assume the event e is happening in the same region (city, state, etc.) as trajectory $\gamma$ is happening.

Algorithm 3, shown in FIG. 7, summarizes the idea of finding the relevancy between a given cutting point p and each event $e \in E$. Input values $th_p$ and $th_{tp}$ are distance-based thresholds for physical fact and temporal-physical event respectively. In this algorithm, a function Haversine returns the Haversine distance between two GPS points. Also, regarding the definition of time overlap for different types of events, a function TimeMatch checks the existence of overlap between the time of input event e and cutting point p and returns 1 in case of existence of any overlap.

In this study, physical facts and temporal-physical events are leveraged to build the event database E to be used as input of the context analysis component. Details about creating the event database are described elsewhere herein.

The following provides an example of the manner in which the framework of the present invention can be applied to a dataset of personal car trajectories to discover context. In summary, for several contexts in the test set, higher correlation between driving patterns and physical facts about the routes is observed. On the other hand, significant correlation is not found between driving patterns and temporal physical events.

A number of different source of spatio-temporal data are used to build and evaluate components of the framework. These datasets are Trajectories, Physical Facts, and Temporal-Physical Events. Each dataset is described in the following subsections.

1) Trajectories: A rich, real-world dataset of about 110,000 trajectories by 103 drivers is used. Trajectories were collected between July 2011 and January 2014. The Trajectories provide driving profiles for personal vehicles, rather than taxi cabs or other kinds of transportation vehicles. This data is collected by devices connected to the On Board Diagnostic (OBD) port of the vehicles, including a variety of useful data items such as speed, acceleration, GPS coordinates, and heading, by way of example. The dataset is highly granular, with data being collected at a consistent sampling rate, e.g., 1 second for all trajectories.

Table I (shown in FIG. 8A) shows more statistical detail about the Trajectories dataset. Note that the number of drivers reported in Table I refers to unique drivers. Ninety five percent of trajectories were used for training (i.e., creating the Markov model) and 5% as the test set (i.e., for evaluation). The basis for choosing the test set is to study the behavior of drivers on a set of common routes. The test dataset contains about 4,500 trajectories of 92 drivers for five popular routes in the city. To create this test set, for a given route, the starting and end points in the route were specified. Then, the portion of all trajectories that could be matched with the selected part of the route was chosen. In this way, for each route in the test set, all trajectories have the same start and end locations on the map. The detail about the routes and number of trajectories for each is summarized in Table II (shown in FIG. 8B).

2) Physical Facts: Physical facts may be drawn from several different publicly or commercially available sources of data in order to prepare the event database. For example, Open Street Map (OSM) (a publicly available source of annotations for different places all around the world) may be used. To use such data more efficiently, only a subset of the available annotations may be used, specifically those which are related to physical facts, such as exit/merge, ramp, and bridge, by way of example. Hand-Curated Annotations (HCA) may also be used. More particularly, because physical fact data sources may not be considered as a comprehensive source of data, routes may be annotated in the test set by using manually collected annotations. Examples of annotations in this set are sharp turn, smooth turn, exit/merge, and intersection.

3) Temporal-Physical Events: One of the best examples of a temporal-physical event is traffic congestion which may be found in traffic congestion reports. However, since there is no publicly available historical source of traffic congestion report that can be matched to the dataset, different publicly or commercially available APIs with traffic-based data may be used to collect real-time traffic reports. The real-time data may then be mapped to the dataset by splitting the days of the week into weekdays (WD) and weekends (WE) and also breaking a day into three non-overlapping time intervals (P1, P2, and P3) of the same length (i.e., 8 hours each), starting from 12:00 AM. More detail about how to redefine the concept of time overlap is provided in the discussion of causality analysis herein. The exemplary traffic dataset is for a course of six months (from February 2016 to August 2016) and contains about 2,850 congestion reports for the routes in the test set. A summary of the congestion reports dataset is provided in Table III, shown in FIG. 8C.

The usage of the Segmentation approach for the dataset is now described in more detail. Regarding the overall process of the segmentation component (FIG. 2), the training set is used to create and to regularize the Markov model. Based on Algorithm 1, $S_{th}$, $A_{th}$, and $H_{th}$ are set to 5, 1, and 0 respectively. The regularized Markov model consists of about 253,000 states and 56 million transitions between states. The process described elsewhere herein is used to segment trajectories in the test set. To find the upper bound on the number of existing segments, i.e., K, a heuristic is used as follows: for a given trajectory γ of length N, we set K=N/10. Based on our earlier observations and also the segmentation result which is illustrated in Table II, this appears to be a reasonable upper bound. Note that the best number of segments is likely a result of the length of the trajectories in test set. Table II summarizes the segmentation results by providing the average and standard deviation for the number of segments for trajectories in different routes of the test set.

In this sub-section, the result of applying the framework to discover properties of each context is described. As described in previous sub-sections, physical facts, from OSM and HCA, and temporal-physical events, from traffic congestion reports, are used to create the event database E. The causality analysis is conducted by introducing a new measure, Coverage, which is defines as follows: suppose that for a set of $\Gamma=\{(\gamma_1, \gamma_2, \ldots, \gamma_M\}$ that happened on route R, we found a sequence of cutting points $cp_i=(p_{i1}, p_{i2}, \ldots)$ for each $\gamma_i \in \Gamma$, as result of segmentation process. Then, given an event database E, Equation 5 is used to obtain the coverage for route R:

$$\text{Coverage}(R, \varepsilon) = \frac{\sum_{i=1}^{i=M} \sum_{p \in cp_i} CheckRelevancy(p, \varepsilon, th_p, th_{tp})}{\sum_{i=1}^{i=M} |cp_i|} \quad (5)$$

The function CheckRelevancy works based on Algorithm 3 (shown in FIG. 7), where $th_p$ and $th_{1p}$ are distance-based thresholds and both of them are set as 200 meters.

For causality analysis, three different tasks are defined based on the source of event data, described as follows.

Figure 9:
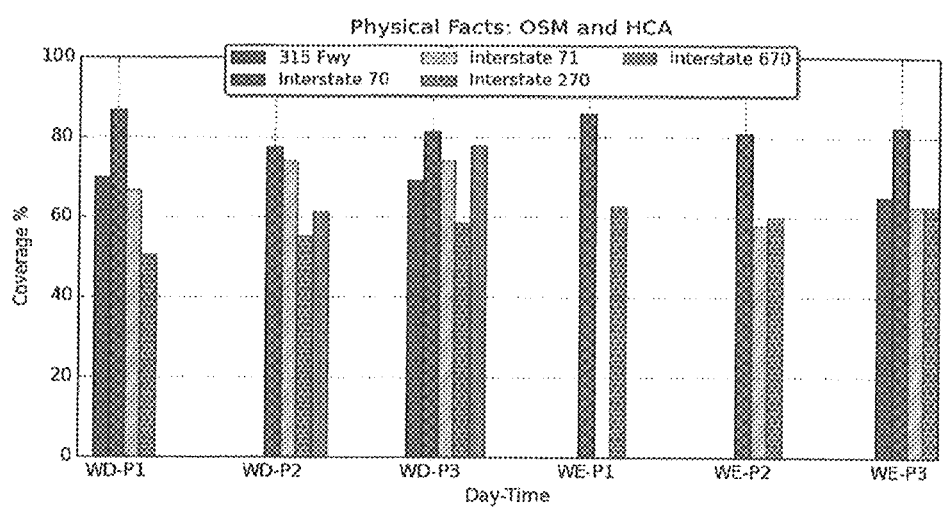
FIG. 9 illustrates physical facts associated with the methodology of an embodiment of the present invention.

1) Event data as Physical Facts: First, physical facts are used to build the event database E and conduct the causality analysis. As shown in FIG. 9, coverage of the segments' cutting points by Physical Facts which are provided by OSM and HCA. The coverage shows how correlated behavior-based driving patterns are to physical properties of different routes. WD and WE are stand for weekday and weekend respectively. P1, P2, and P3 show different time intervals of the day The coverage of cutting points for different routes with respect to the physical facts, based on different days of the week and times of the day, is shown. On average, about 74% of the driving patterns are correlated with physical properties of routes. Note that a correlation value of 0 means that either there is no correlation or there is not enough trajectory data to conduct correlation analysis. Also, as most of the trajectories in test set happened during weekdays, rather than the weekend, correlation values for weekdays are more significant than weekend. It is shown that, for different contexts, it is reasonable to assume that a driver's behavior is highly affected by physical properties of the route. How-ever, different contexts may show different patterns of correlation, depending on the properties of each context.

2) Event data as Temporal-Physical Events: Temporal-physical events may be used to build the database E and conduct causality analysis. However, the fact that a cutting point p may be related to a temporal-physical event e which happened at a different time is taken into account. More particularly, the time overlap concept described herein, cannot be directly applied to find the correlation between a real-time event e and a cutting point p which is part of a historical trajectory. However, some heuristics can be used to partially overcome the above challenge. As the temporal-physical events in the study are about traffic congestion, the following heuristic can be used to deal with the mentioned challenge: for a given cutting point p, if C traffic congestion is observed within the same location (regarding the distance threshold) on the same type of day (weekday or weekend) and time interval (P1, P2, or P3), then it can be said that p is related to, or covered by, traffic congestion. In other words, the definition of TimeMatch in Algorithm 3 is relaxed. The final question is how the value of C may be determined. C may be set to be equal to D/3 in experiments, where D is the number of weekdays (weekends) in the temporal-physical event dataset. Because the dataset covers six months, C is set as 43 and 17 for weekdays and weekends, respectively. Also, as the congestion reports from the third party service providers may overlap, each cutting point p is separately matched with both/all of the third party service reports.

Figure 10:
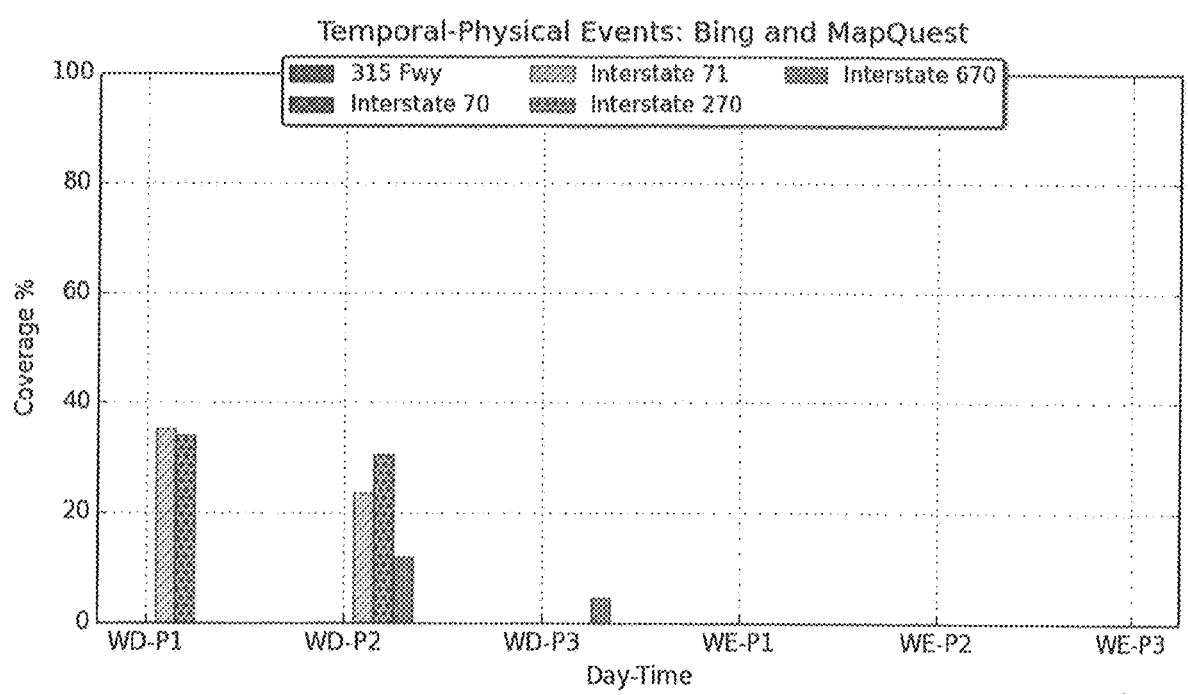
FIG. 10 illustrates temporal-physical facts associated with the methodology of an embodiment of the present invention.

FIG. 10 illustrates coverage of the segments' cutting points by Temporal-Physical Facts that may be obtained through various APIs offering rich traffic-based data. The coverage shows how correlated behavior-based driving patterns are to traffic congestion. This diagram reveals there is higher correlation between driving patterns and traffic congestion in Weekdays (WD) rather than Weekends (WE). Also, higher correlation is observed for first (P1) and second (P2) time intervals of the day. On average, less than 2% of driving patterns are correlated with traffic congestion. Regarding the information in Table III shown in FIG. 8C and FIG. 10, the larger the number of reports for the route is, the larger is the coverage for that route. Thus, while the analysis with respect to traffic data is not comprehensive enough, significant correlation is observed between driving patterns and traffic congestion for some routes (contexts) such as the Interstates 270 and 71. Moreover, traffic congestion appears to have more effect on driving patterns for those trajectories which happen within the first and second time intervals of the day. Such observations may form the extracted insights for the contexts under the study.

Figure 11:
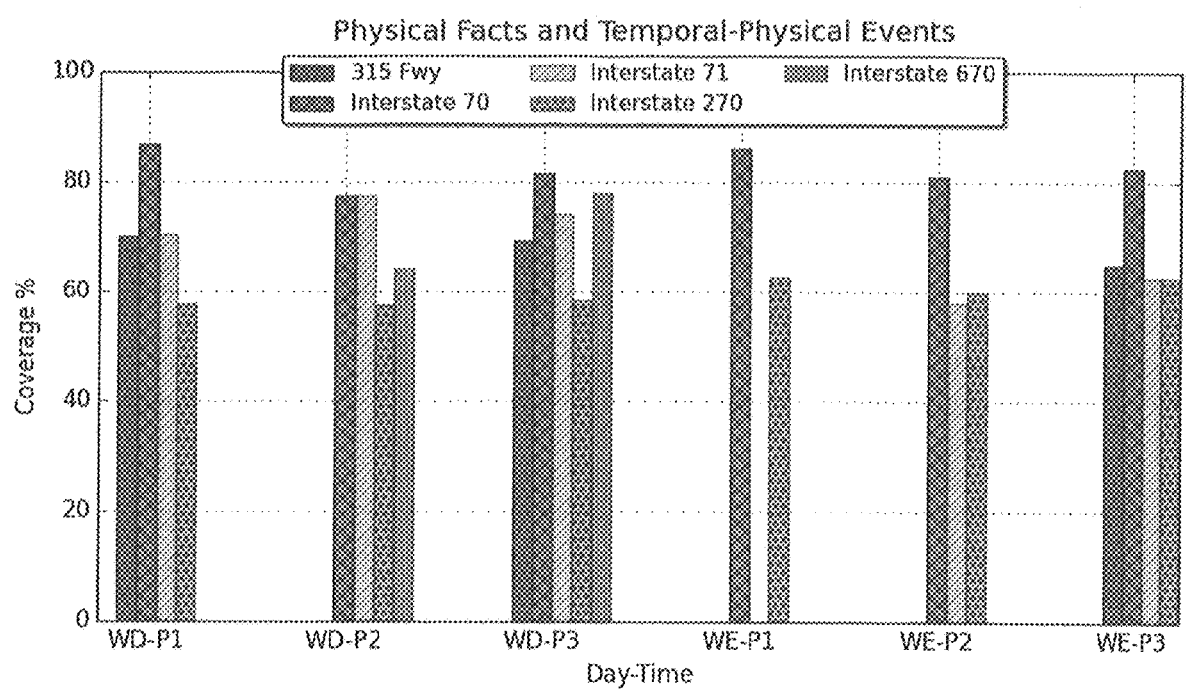
FIG. 11 illustrates physical and temporal-physical facts associated with the methodology of an embodiment of the present invention.

3) Event data as jointly considering Physical Facts and Temporal-Physical Events: Both sets of event data (i.e., Physical Facts and Temporal-Physical Events) may be considered together. FIG. 11 demonstrates the coverage of segments cutting points by the set of all existing events and, more particularly, coverage of segments' cutting points by Physical Facts and Temporal-Physical Events obtainable through publicly or commercially available physical location, route, and traffic data sources. The coverage shows how correlated are behavior-based driving patterns to physical properties of routes and traffic congestion. Taken as a whole, on average, 74% of driving patterns are correlated with either of sources of events. However, different contexts (routes) represent different patterns of correlation which outlines the characteristics of them. Each source of event is examined separately to validate the coverage, as different sources may have overlap. For example, a cutting point p can be covered by both physical facts and temporal-physical events. However, it is used only once to calculate the final coverage. An interesting observation by comparing FIGS. 9, 10, and 11 is that some portion of driving patterns, in routes such as Interstates 71 and 270, are correlated with both physical facts and temporal-physical events. However, for the context of Interstate 270, the correlation between driving patterns and the set of all event data is still significantly lower than the other contexts under the study.

With regard to segmentation, the approach of embodiments of the present invention takes the behavior of drivers into consideration to segment a trajectory, such that resulting segments demonstrate different patterns of behavior.

The causality analysis, as described herein, illustrates three aspects 1) the applicability of the segmentation approach; 2) the predictability (interpretability) of the behavior of drivers and 3) usefulness of the framework for discovery of characteristics of a context. For the first aspect, it is observed that about 74% of extracted driving patterns are justified by some extrinsic cause. This observation is akin to the measure of precision, which shows how accurate the segmentation component is for the extraction of true existing patterns. In addition, it is observed how predictable the behavior of a driver is with respect to different situations, such as existence of an intersection, merging into a highway, or facing traffic congestion, by way of example. Finally, the causality analysis demonstrates how useful the framework is as an end to-end solution for the discovery of driving context from driving patterns.

Regarding the capability of the framework as an end-to-end solution, it can be used to study and to explore the context of driving. For example, the application of the framework for a given route (context) may find driving patterns are on average 55% correlated with traffic congestion. An insurance company may use such contextual information to study the behavior of an individual driver in order to find how risky or safe he/she is, regarding the specific context under the study, as described with reference to Example 3. Learning about contextual characteristics for different contexts, the system may lead to the discovery of valuable insights about similarities and differences between driving habits for different types of the driver behavior. For example, it is noted that when the focus is on a highway as the type of the road under study, interesting insights were observed. For example, in FIG. 11, the coverage of the cutting points of the segments on Interstate 270 is significantly lower than in other routes during the weekdays. This observation may represent the driving style for Interstate 270 and it may also suggest there is some event or fact that underlies the patterns of driving behavior on this route. To understand what these events may be, publicly available traffic data reports may be examined, such as the Annual Average Daily Traffic (AADT) reports available through the State of Ohio Department Of Transportation (DOT). For example, based on DOT AADT reports for the Columbus, Ohio region in 2010 and 2014 (the most recent ones), as demonstrated by Tables IV and V respectively, shown in FIGS. 12A and 12B, it is observed that the proportion of trucks that use Interstate 270 for transportation is significantly larger than for other routes in the test set. Thus, the presence of trucks may be a potential reason for the difference in the coverage of driving patterns (cutting points) by available extrinsic causes on Interstate 270 in comparison to the other routes in the test set. Tables IV and V also provide the length of the routes and total number of vehicles that use each route as reported by DOT. Note that, for each route in test set, DOT reports just cover a portion of the route that is used in the test set, not the entire route on the map.

Segmentation is the task of breaking a trajectory into several partitions based on a set of optimization goals (e.g., minimizing the number of segments, maximizing homogeneity within segments, by way of example). This task has been addressed in the literature in several studies. For example, a greedy segmentation algorithm exploits a set of monotonic spatio-temporal criteria (e.g., defining relative thresholds for some feature values) on features like speed, and heading, by way of example. Such work has been extended to both monotonic and non-monotonic criteria. However, such criteria-based methods need human input for tuning parameters. Moreover, they are context-agnostic in that they only consider the input trajectory and not the whole dataset. Therefore, the optimization process is a local one. In contrast, in connection with embodiments of the present invention, a global optimization approach to segmentation may be used, which provides a better solution. With regard to the segmentation process, a context-aware approach is taken by building a Markov model for the whole dataset prior to segmentation. Like segmentation, some context-aware approaches are proposed in the literature. For example, a context-aware approach is presented in the literature that builds a Brownian Bridge model and uses a dynamic programming approach to capture the best set of segments of animal movements. While segmentation in connection with the present invention bears some similarities with existing literature, it exploits a normal distribution model instead, which is more suitable for car transportation data. In certain prior studies, a trajectory-to-signal transformation is performed prior to segmentation using similarity values between each line segment of input trajectory and the rest of the line segments in the dataset, using global voting. Then, segmentation discovery is performed using a sliding-window approach. Segmentation of the approach of the present invention, in contrast, performs a behavior likelihood-based transformation to provide a behavior based-segmentation and to find the segments which are representative of patterns of driving behavior. Essentially, segmentation performed in accordance with the embodiments of the present invention is a global optimization-based approach that builds up a model on the entire dataset. Also, there is no need for human intervention in segmentation of the present invention.

Semantic annotation may be used to explore insights encapsulated in trajectories using data analysis methodologies. Semantic annotation has applications in different domains, such as discovery of transportation mode, map matching, annotation based on points of interests, providing descriptive summaries of trajectories, and discovery of animal migration phases. A significant portion of existing works focuses on points of interest for annotation. One known framework finds stop and move episodes within a trajectory and then exploits additional data resources to label the episodes with semantics, such as Home, Work, Restaurant, and Grocery Store, by way of example. In connection with the framework of the present invention, a finer grained annotation (by causality analysis) is applied, where segments can be stop or move episodes, which can be further segmented by using the approach of the present invention, and each segment is annotated separately.

Discovery of driving behavior patterns (e.g., making turns, changing or maintaining lanes, and accelerating, by way of example) has been studied in the literature. Such studies involve a fully monitored test environment, in which a small set of drivers are provided with instructions in order to measure feature values of vehicles. Then, a Hidden Markov model (HMM) is applied to predict specific driving actions. Driver eye movement is analyzed as an additional feature to predict behavior patterns. However, the prior art exploits a fully monitored context, which is costly and nearly infeasible to employ on a large-scale or to apply for purposes like UBI. In some studies, a time-series matching approach is proposed to discover recurring patterns of driver behavior in an efficient way. While application of this approach to large-scale data is straight-forward, there is no guarantee that meaningful patterns will be found. In contrast, in accordance with the embodiments of the present invention, behavior-based segmentation and an annotation methodology (i.e., causality analysis) are combined to increases chances of discovering meaningful patterns. The framework of the present invention is developed based on externally observable features that are easy to collect. Hence, the framework is applicable on large-scale. Also, in comparison to related art, the framework of the present invention offers more opportunities to find meaningful patterns.

Thus, in accordance with the foregoing exemplary embodiments, a framework is provided as an end-to-end solution for discovery of driving context by extracting driving patterns (segmentation) and analyzing them by exploring the underlying causes that caused each pattern to happen (context analysis). The described trajectory segmentation approach for finding driving patterns takes the behavior of a driver into consideration and compares it to the behavior of a population of drivers in order to specify segments for a given trajectory. Moreover, the context analysis methodology allows for conducting analysis across a set of spatio-temporal data sources to find underlying causes for behavior-based driving patterns. The framework thus allows for discovery of driving context which employs efficient approaches for patterns extraction and analysis and is applicable on large scale. The systems and methods of the present invention allow for discovering and analyzing the context of driving in order to learn about existing patterns and to study the correlation between patterns and extrinsic (or intrinsic) causes, for a given route, city, or region of interest. Having such contextual data allows for analyzing the behavior of drivers within the same context, to see how safe or risky their behavior patterns are. Moreover, the correlation between different driving contexts can be analyzed to see how contexts are impactful on driving habits.

Additional embodiments that are within the scope of the present invention involve those in which, for example, additional external sources of spatio-temporal data may be used in context analysis, such as social media data. Moreover, driving patterns can be annotated with intentional actions like lane change, turn, and acceleration. Having annotated segments, meaningful sequences of driving patterns can be analyzed by using sequence mining approaches. Such sequences can describe the behavior of drivers with a more meaningful representation. More particularly, sequences of patterns are similar to precise annotations of behavior and show how common or uncommon different sequences of driving patterns may be. Finally, the result of such a behavior analysis can be used to coach drivers, based on their behavior profile in comparison with other drivers who are driving the same route under the same conditions.

Figure 13:
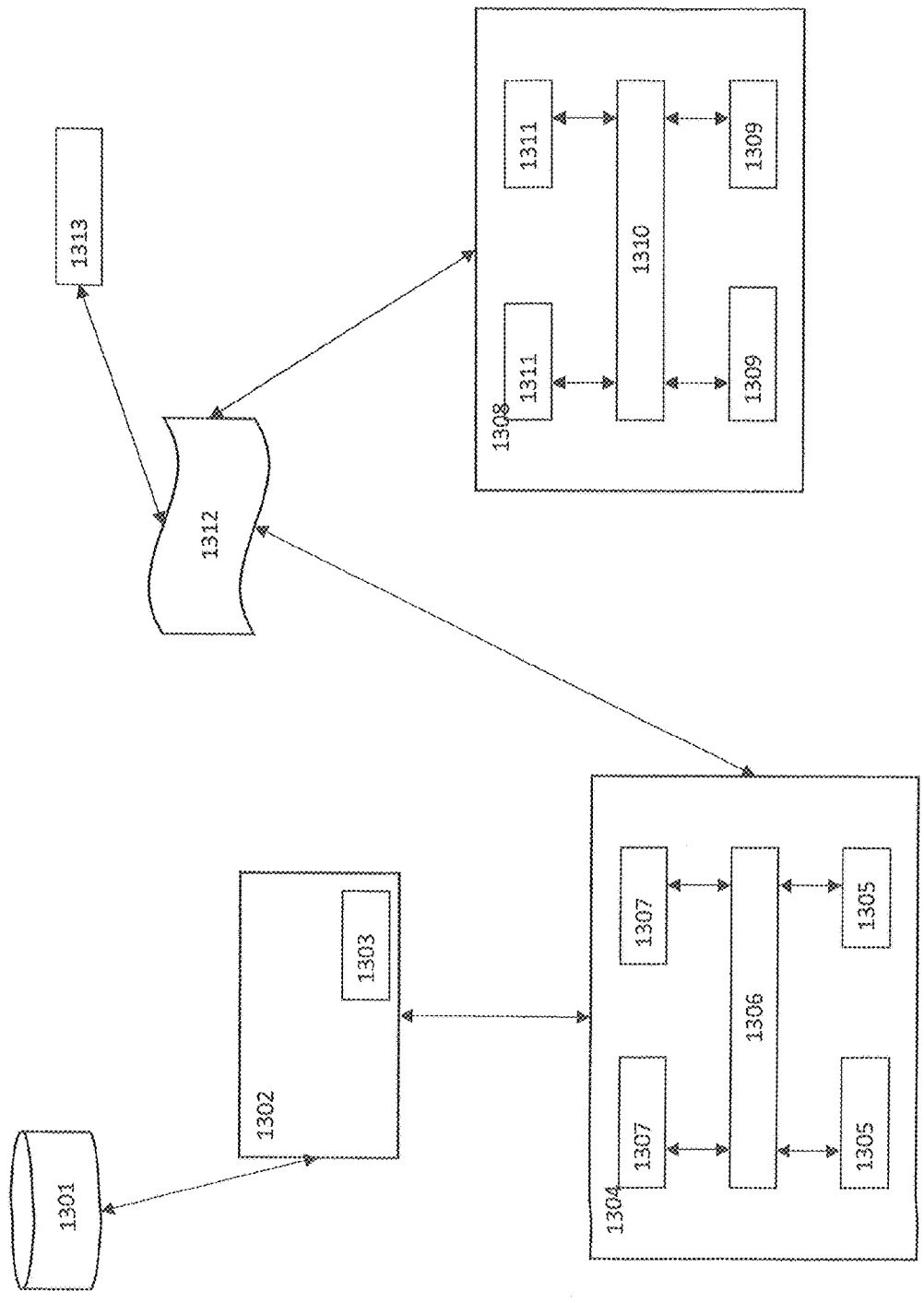
FIG. 13 provides an exemplary system for carrying out the methods of the present invention.

In some embodiments, the methods are carried out by a system that employs a client/server architecture. Such exemplary embodiments are described as follows with reference to FIG. 13. The data that may be used as an input to the system, and the outputs from the system, may be stored in one or more databases 1301. Database server(s) 1302 may include a database services management application 1303 that manages storage and retrieval of data from the database(s) 1301. The databases 1301 may be relational databases; however, other data organizational structures may be used without departing from the scope of the present invention.

One or more application server(s) 1304 are in communication with the database server 1302. The application server 1304 communicates requests for data to the database server 1302. The database server 1302 retrieves the requested data. The application server 1304 may also send data to the database server 1302 for storage in the database(s) 1301. The application server 1304 comprises one or more processors 1305, non-transitory computer readable storage media 1307 that store programs (computer readable instructions) for execution by the processor(s), and an interface 1306 between the processor(s) 1305 and computer readable storage media 1307. The application server 1304 may store the computer programs referred to herein.

To the extent data and information is communicated over a network (e.g., the Internet or an Intranet, cellular or WiFI network), one or more network servers 1308 may be employed. The network server 1308 also comprises one or more processors 1309, computer readable storage media 1311 that store programs (computer readable instructions) for execution by the processor(s), and an interface 1310 between the processor(s) 1309 and computer readable storage media 1311. The network server 1308 is employed to receive content that can be transmitted through the communications network 1312, e.g., by device 1313 (e.g., device 10 of FIG. 1).

The computers referenced herein are specially programmed to perform the functionality described herein.

The non-transitory computer readable storage media (e.g., 1307 or 1311) that store the programs (i.e., software modules comprising computer readable instructions) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

An example of how the methods of the present invention may be used is now described, with reference to FIGS. 1 and 14. Device 10 collects driving data from a vehicle and transmits to a server 20, in step 1401. The server 20 analyzes the driving data to determine patterns/segmentations based on differentiations in the driving data, in step 1402. In step 1403, the server 20 receives event data from one or more internal or external databases 25 (e.g., an internal database with HCAs) and one or more external databases (such as Open Street Map, Bing Traffic, social media feeds and a weather data source), accessed via publicly available APIs, for times and locations that correspond with the times and locations reported in the driving data. The server 20 correlates the times and locations of the driving data with the times and locations of the event data, in step 1404. The server 20 analyzes the correlations to determine one or more associations between the driving data and the event data, wherein the associations establish a causal relationship between the patterns/segmentations of the driving data and the event data, in step 1405. The server 20 makes an underwriting/rating decision for the vehicle or its driver based at least in part on the determined associations, in step 1406.

A computer is required to process the data gathered by the device at least because there is a large amount of data that needs to be processed and it would be impossible for a human to perform such action. For example, the Trajectory Segmentation methodology requires a computer to build automatically a behavior-based model for a large population of drivers and then accomplish the segmentation task. In a typical implementation, millions of trajectories are modeled and segmentation analysis must be performed on them. Multiple models can be created to stratify the data. For example, a model for certain time periods can be used, in which the time and place an individual is driving is modeled for that time frame. In another example, male drivers, aged 16-25, who regularly drive a certain route having certain physical facts may be evaluated under their own model. In addition, a computer is required to find the relation between behavior patterns (i.e., segments) and event data, to enable review of several large datasets of event data and find the correlations by analysis.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A system for collecting and evaluating data associated with operation of a vehicle, the system comprising:
   a device coupled to a vehicle, the device configured to collect vehicle trajectory data associated with the operation of the vehicle; and
   one or more servers, coupled to the device, the one or more servers configured to:
      segment the vehicle trajectory data into a plurality of segments based on a transition between each segment of the plurality of segments of the vehicle trajectory data, each segment of the plurality of segments being initiated by a cutting index that represents the transition;
      retrieve event data from one or more databases, the event data including time data and location data, wherein the time data and the location data correspond to the vehicle trajectory data;
      correlate one of the plurality of segments with the event data using the time data and the location data to generate one or more driving condition correlations;
      generate one or more causal relationships between the vehicle trajectory data and the event data based on the one or more driving condition correlations, the one or more causal relationships representing driver behavior during the event data and at least one of the plurality segments; and
      generate a correlation rate based on the one or more causal relationships, the correlation rate being indicative of an overall driver behavior associated with the vehicle.

2. The system of claim 1, wherein the one or more servers is further configured to:
   compare the correlation rate to a correlation rate of a reference population of overall behaviors of other drivers to generate a comparison.

3. The system of claim 2, wherein the one or more servers is further configured to:
   generate a risk value associated with the overall driver behavior based on the comparison.

4. The system of claim 1, wherein each segment of the plurality of segments includes a neighboring segment and each respective neighboring segment represents homogenous driver behavior within the respective neighboring segment and dissimilarity in driver behavior between respective neighboring segments.

5. A method of collecting and evaluating data associated with operation of a vehicle, the method comprising:
   collecting, from a device coupled to a vehicle, vehicle trajectory data associated with the operation of the vehicle;
   segmenting the vehicle trajectory data into a plurality of segments based on a transition between each segment of the plurality of segments of the vehicle trajectory data, each segment of the plurality of segments being initiated by a cutting index that represents the transition;
   retrieving event data from one or more databases, the event data including time data and location data, wherein the time data and the location data correspond to the vehicle trajectory data;
   correlating one of the plurality of segments with the event data using the time data and the location data to generate one or more driving condition correlations;
   generating one or more causal relationships between the vehicle trajectory data and the event data based on the one or more driving condition correlations, the one or more causal relationships representing driver behavior during the event data and at least one of the plurality segments; and
   generating a correlation rate based on the one or more causal relationships, the correlation rate being indicative of an overall driver behavior associated with the vehicle.

6. The method of claim 5 further comprising
generating underwriting data for the vehicle or the driver associated with the vehicle based on the one or more associations.

\* \* \* \* \*